United States Patent Office 2,884,400
Patented Apr. 28, 1959

2,884,400

POLYCHLOROPRENE AND BUTADIENE-STYRENE COPOLYMER ADHESIVE COMPOSITION AND PROCESS OF PREPARING SAME

Clarence D. Moore, Lancaster, Pa., assignor to Armstrong Cork Company, Lancaster, Pa., a corporation of Pennsylvania No Drawing. Application December 10, 1954
Serial No. 474,618

6 Claims. (Cl. 260—33.6)

This invention relates to adhesives, and more particularly to rubber-base adhesives. Still more particularly it relates to a rubber-base adhesive possessing excellent heat fatigue resistance and a good tack range.

The preparation of rubber-base adhesives containing polychloroprene (neoprene) admixed with other substances is well known. Although such prior adhesives have been useful in many applications, their usefulness has been limited in those uses requiring excellent heat fatigue resistance and good tack range.

It is an object of the present invention to supply such an adhesive.

According to the present invention, an adhesive is prepared by blending together a first constituent comprising a rubbery linear polymer capable of curing in the final stages to a cross linked polymer, such as polychloroprene, and a second constituent capable of curing by the chemical addition of sulfur, such as a butadiene-styrene copolymer, for example, GR-S. The blended mass is then heated in the absence of sulfur to a temperature sufficient to cause cross linking of the first constituent. The resultant product is then dispersed in a solvent.

The first constituent comprising a rubbery linear polymer capable of curing in the final stages to a cross linked polymer is preferably polychloroprene. The second constituent capable of curing by the chemical addition of sulfur is preferably one of the butadiene-styrene rubbers such as GR-S.

Based on 100 parts by weight of the blend of the two rubbers, the maximum amount of the first constituent should be about 75 parts by weight. Greater amounts of the first constituent produce a mass that may be dispersed during mixing but which quickly separates upon standing. Lesser amounts may be used, however, without causing any difficulty. Preferably there should be at least about 5 parts by weight of the first constituent per 100 parts by weight of the total rubber blend in order that the final adhesive may possess the highly desirable increased heat fatigue resistance. Thus the rubber blend may have a composition which varies from about 75 parts of the first constituent with about 25 parts of the second constituent to about 5 parts of the first constituent with about 95 parts of the second constituent.

The mixing of the two types of rubber is preferably carried out in a Banbury mixer. In order that the mass may be prevented from breaking up under the mixing action and, further, to impart tack and adhesion, the mixing and curing is preferably carried out in the presence of a resin. Suitable resins may be generally described as those having compatibility with both rubbers and melting or softening points under 325° F. Examples of such resins are stabilized rosin, terpene-phenolic resins, cumar resins, and terpene resins.

By proper selection of resins to be blended with the two rubbery constituents, adhesives of different physical properties can be prepared, varying from those that are permanently tacky to those with extraordinarily high heat resistance and substantially shorter tack range. The amount of resin or resin mixture to be added to the rubber blend can vary from about 5 parts by weight resin per 100 parts rubber blend to about 150 parts by weight resin per 100 parts rubber blend. The preferred range is 50–110 parts by weight resin per 100 parts by weight rubber blend.

The resins and rubbery constituents are hot mixed in an internal type mixer to a temperature in the range of about 230°–325° F. Mixing is carried out in the absence of sulfur until the cure of the first constituent is substantially complete. The time of mixing will depend on the temperature used within the range outlined above. A longer time will be required for temperatures only slightly above the minimum of 230° F., at which temperature the cure of the first constituent such as polychloroprene takes place at a slow rate. The temperature should not exceed the upper limit of about 325° F., since to do so causes decomposition of the polychloroprene, oxidization of the GR-S, and loss of volatile compounding agents.

Since the composition of the present invention contains no sulfur and since the curing temperature is controlled, it can be seen that the present process is one in which one of two rubbers in the blend can be cured under conditions that permit the other to remain basically unchanged. At elevated temperatures, the polychloroprene, for example, undergoes curing by cross linking, while the butadiene-styrene copolymer remains substantially unchanged, that is, the copolymer remains uncured. By bringing about this selective curing, the rubber mass will increase substantially in cohesive strength, stiffness, and elasticity but will still retain the ability of the uncured mass to be wet by and dispersed in those solvents normally used to dissolve butadiene-styrene rubbers. By varying the proportions of the two constituents as outlined above, it is possible to vary the cohesive strength and elasticity of the final adhesive. Amounts of polychloroprene near the maximum amount as described above yield an adhesive of increased cohesive strength and decreased elasticity. Amounts of polychloroprene near the minimum described above yield an adhesive of decreased cohesive strength and increased elasticity.

There may also be added during the blending of the two constituents accelerators such as zinc oxide, litharge, and the common organic accelerators. Fillers may be utilized, as for example Loomite talc, ZnO, clay, whiting, asbestos, and carbon black.

The final mass is preferably dispersed in a rubber solvent. Examples of such solvents are Shell rubber solvent (a medium boiling naphtha), Gulf VM & P naphtha, toluol, and xylol. These solvents are preferably added after cure of the first constituent has taken place and when the blended mass has been cooled somewhat. The amount of solvent to be added may vary between wide limits, but it is preferred that the amount of solvent be such that the solids content of the final adhesive should be in the range of about 20–70% by weight. Reference is made to copending application Serial No. 363,671, filed June 23, 1953.

The following examples illustrate the invention. All parts listed are by weight unless otherwise noted.

Example I

Into a Banbury type mixer there is placed:

| | Parts |
|---|---|
| GR-S 1013 (a 58% butadiene, 42% styrene copolymer) | 35.0 |
| Neoprene W (a nonsulfur modified general purpose polychloroprene) | 65.0 |
| ZnO (accelerator for neoprene) | 37.0 |
| Accelerator 833 (condensation product of butyraldehyde and monobutylamine) | 0.5 |
| Agerite Stalite (heptylated diphenylamine) | 1.0 |
| Polypale resin (hard, brittle polymerized rosin, M.P. 208°–217° F.) | 62.0 |

The above mixture was blended for 30 minutes at a temperature of 300° F. At the end of that period of time, the mix was cooled and there was added 245 parts naphtha as a rubber solvent. When dispersion was complete, the product proved to be an adhesive having extraordinary heat fatigue resistance and a tack range of about 2 hours.

Example II

Into a Banbury there is placed:

| | Parts |
|---|---|
| GR-S 1009 (a 76.25% butadiene, 23.25% styrene, 0.5% divinyl benzene copolymer) | 35.0 |
| GR-S 1013 | 35.0 |
| Neoprene W | 9.5 |
| ZnO | 3.5 |
| Accelerator 833 | 0.3 |
| DBPC (a crystalline alkylated tar acid compound; antioxidant) | 1.5 |
| Loomite talc (magnesium silicate) | 13.0 |
| Isoester "A" (stabilized rosin) | 6.0 | and the mixture was blended for 35 minutes at 300° F. On cooling, there was added 65 more parts Isoester "A" plus 30 parts Hercolyn (a hydrogenated methyl ester of rosin). On dissolving the mass in 250 parts rubber solvent, the resultant adhesive was permanently tacky.

I claim:

1. The method of making a rubber-base adhesive which comprises blending together a polychloroprene and a rubbery butadiene-styrene copolymer, heating said blend to a temperature in the range of about 230°–325° F. to selectively cure said polychloroprene by the agency of heat while maintaining said copolymer uncured, and dispersing the resulting product in a solvent for said selectively cured blend.

2. The method of making a rubber-base adhesive which comprises blending together a polychloroprene, a rubbery butadiene-styrene copolymer, a tackifier resin compatible with said polychloroprene and said copolymer, a filler, and an accelerator for hastening the cure of said polychloroprene; heating said blend to a temperature in the range of about 230°–325° F. to selectively cure said polychloroprene by the agency of heat while maintaining said copolymer uncured; and dispersing said selectively cured blend in a solvent therefor.

3. The method of making a rubber-base adhesive which comprises blending together about 5–75 parts by weight polychloroprene, about 95–25 parts by weight of a rubbery butadiene-styrene copolymer, a tackifier resin compatible with said polychloroprene and said copolymer in an amount in the range of about 5–150 parts by weight resin per 100 parts by weight of the mixture of said polychloroprene and said copolymer, a filler, and an accelerator for hastening the cure of said polychloroprene; heating said blend to a temperature in the range of about 230°–325° F. to selectively cure said polychloroprene by the agency of heat while maintaining said copolymer uncured; and dispersing said selectively cured blend in a solvent therefor to a solids content of about 20–70% by weight.

4. A rubber-base adhesive comprising a solution of a rubbery blend in an organic solvent therefor, said rubbery blend being prepared by intimately mixing uncured rubbery butadiene-styrene copolymer and uncured polychloroprene, and heating the resulting mixture to a temperature in the range of about 230°–325° F. to selectively cure said polychloroprene by the agency of heat while maintaining said copolymer uncured.

5. A rubber-base adhesive comprising a solution of a rubbery blend in an organic solvent therefor, said rubbery blend being prepared by intimately mixing uncured rubbery butadiene-styrene copolymer, uncured polychloroprene, a tackifier resin compatible with said polychloroprene and said copolymer, a filler, and an accelerator for hastening the cure of said polychloroprene, and heating the resulting mixture to a temperature in the range of about 230°–325° F. to selectively cure said polychloroprene by the agency of heat while maintaining said copolymer uncured.

6. A rubber-base adhesive comprising a solution of a rubbery blend in an organic solvent therefor, said rubbery blend being prepared by intimately mixing relative proportions of about 95–25 parts by weight of uncured rubbery butadiene-styrene copolymer, about 5–75 parts by weight uncured polychloroprene, about 5–150 parts by weight tackifier resin compatible with said polychloroprene and said copolymer, a filler, and an accelerator for hastening the cure of said polychloroprene, and heating the resulting mixture to a temperature in the range of about 230°–325° F. to selectively cure said polychloroprene by the agency of heat while maintaining said copolymer uncured.

References Cited in the file of this patent

UNITED STATES PATENTS

| 2,522,277 | Knowland et al. | Sept. 12, 1950 |
| 2,540,596 | Rehner et al. | Feb. 6, 1951 |
| 2,541,550 | Sarbach et al. | Feb. 13, 1951 |
| 2,658,050 | Signer et al. | Nov. 3, 1953 |
| 2,767,152 | Bierman et al. | Oct. 16, 1956 |

FOREIGN PATENTS

| 530,512 | Great Britain | Dec. 13, 1940 |
| 596,716 | Great Britain | Jan. 9, 1948 |

OTHER REFERENCES

Vanderbilt Rubber Handbook, page 85, 9th edition (1948), published by R. T. Vanderbilt Co., New York.